United States Patent [19]

Kogane et al.

[11] Patent Number: 4,749,435

[45] Date of Patent: Jun. 7, 1988

[54] APPARATUS FOR AND METHOD OF PRODUCING RESIN LAMINATED CARDS

[75] Inventors: Mikio Kogane; Nobuo Watase; Mizuho Nishimura, all of Kanagawa, Japan

[73] Assignee: Fuji Photo Film Co., Ltd., Kanagawa, Japan

[21] Appl. No.: 920,338

[22] Filed: Oct. 17, 1986

[30] Foreign Application Priority Data

| Oct. 18, 1985 | [JP] | Japan | 60-233063 |
| Oct. 18, 1985 | [JP] | Japan | 60-233064 |
| Oct. 23, 1985 | [JP] | Japan | 60-237076 |
| Oct. 24, 1985 | [JP] | Japan | 60-238519 |

[51] Int. Cl.⁴ .................................... B32B 31/20
[52] U.S. Cl. .......................... 156/308.4; 100/229 A; 156/498; 156/583.1; 269/287
[58] Field of Search ............ 100/229 A, 229 R; 156/307.4, 308.4, 498, 583.1; 269/287

[56] References Cited

U.S. PATENT DOCUMENTS 3,208,899 9/1965 Bicher ........................ 156/536

Primary Examiner—Robert A. Dawson
Attorney, Agent, or Firm—Sughrue, Mion, Zinn, Macpeak, and Seas

[57] ABSTRACT

A cassette which retains a plurality of stacked resin sheets is loaded on a retaining member of a driving device. A plurality of press-heating stations and a number of cooling stations which is smaller than the number of press-heating stations are disposed around the driving device, and the retaining member is sequentially sent to each of the stations by means of the driving device. In each press-heating station, each of the resin sheets in the cassette retained by the retaining member is thermowelded, and the press-heated resin sheets are cooled in the cooling station. The cassette comprises a cassette body for accommodating a plurality of stacked resin sheets, and a pressing plate brought into contact with the stacked resin sheets so as to press them by means of a resilient member such as a coned disk spring. Thus, the resin sheets are moved from one press-heating station to another while being maintained in a pressed state.

22 Claims, 10 Drawing Sheets

APPARATUS FOR AND METHOD OF PRODUCING RESIN LAMINATED CARDS

BACKGROUND OF THE INVENTION

1. Field of the Invention

The present invention relates to an apparatus for producing resin laminated cards by thermowelding a plurality of resin sheets.

2. Description of the Related Art

Resin laminated cards are produced in such a manner that printed matter which carries a picture, characters, etc. is clamped between a plurality of resin sheets, and these resin sheets are thermowelded together to seal the printed matter. This technique is now applied to ID cards, driver's licenses and the like.

A typical conventional apparatus for producing such resin laminated cards is arranged such that a plurality of resin sheets which have printed matter clamped therebetween are thermowelded using press means and a heater.

In this conventional apparatus, a jig for clamping a plurality of resin sheets is inserted into a press machine where the resin sheets are thermowelded by means of a pressing force applied by the press machine and heating applied by the heater, and after the press machine has been released, the jig is taken out, and another jig which clamps new resin sheets is inserted into the machine.

Therefore, the conventional apparatus takes a disadvantageously long time to produce a resin laminated card, and it has heretofore been impossible to obtain a multiplicity of resin laminated cards, such as ID cards, within a short period of time.

SUMMARY OF THE INVENTION

In view of the above-described circumstances, it is a primary object of the present invention to provide a method which enables a multiplicity of resin laminated cards to be produced within a short period of time, together with an apparatus which is suitably employed to carry out the novel method.

To this end, according to one aspect of the present invention, there is provided a resin laminated card producing apparatus which comprises: a cassette retaining a plurality of resin sheets in a stacked state; a plurality of press-heating stations for thermowelding each of the resin sheets within the cassette; a cooling station for cooling the press-heated resin sheets within the cassette; and driving means for sequentially sending the cassette to each of the stations.

It is generally necessary to heat a material for a resin laminated card under pressure for about four minutes, whereas it only takes two minutes to cool the heated material. Therefore, if a cassette which retains a plurality of resin sheets in a stacked state is sequentially sent to a press-heating station and a cooling station, it is possible to obtain an increased number of resin laminated cards within a reduced period of time as compared with the conventional apparatus. However, in this case, the cassette must be at rest in each station for four minutes which is needed for a press-heating operation. On the other hand, the apparatus according to the present invention has a plurality of press-heating stations; therefore, if, for example, two press-heating stations are provided and a press-heating operation is carried out for two minutes at each station, resin sheets can be subjected to press-heating process for a total of four minutes, and yet the time required for the resin sheets to stay at each station can be reduced to two minutes.

For this purpose, it is preferable to arrange the cassette such that a predetermined pressing force can be maintained while the cassette is moved from one press-heating station to another so that the pressed state formed by the first press-heating station is not canceled.

The driving means is adapted to retain the cassette in such a manner that it is movable in the direction in which resin sheets accommodated therein are pressed, whereby each press-heating station is allowed to press the resin sheets at any desired position in the pressing dierection, so that the manufacture of the apparatus is facilitated.

If the above-described stations are disposed around the driving means, the cassette can be smoothly circulated through the stations, and this enables an improvement in efficiency.

Each press-heating station may be arranged such as to transmit pressing force through coned disk springs. Coned disk springs are suitable for accurately transmitting a relatively large pressing force. The interposition of the coned disk springs facilitates the control of transmission of a relatively large pressing force.

According to another aspect of the present invention, there is provided a cassette which may be employed in the above-described resin laminated card producing apparatus, the cassette comprising: a cassette body for accommodating the above-described plurality of stacked resin sheets; and a pressing plate secured to the cassette body to clamp the resin sheets between the same and the cassette body.

This cassette is preferably further provided with a resilient member which presses the pressing plate against the stacked resin sheets.

The cassette body has a hole for accommodating the resin sheets, and the distance between the bottom of this accommodating hole and the pressing portion of the pressing plate is set such as to be substantially equal to the total thickness of the resin sheets after they have been subjected to thermowelding process.

According to still another aspect of the present invention, there is provided a resin laminated card producing method which comprises the steps of: stacking a cassette with a plurality of resin sheets in such a manner that the sheets are retained by the cassette; sequentially sending this cassette to a plurality of press-heating stations so as to thermoweld each of the resin sheets; and moving the cassette one press-heating station to another while maintaining a pressed state of the cassette.

DESCRIPTION OF THE PREFERRED EMBODIMENTS

Figure 1:
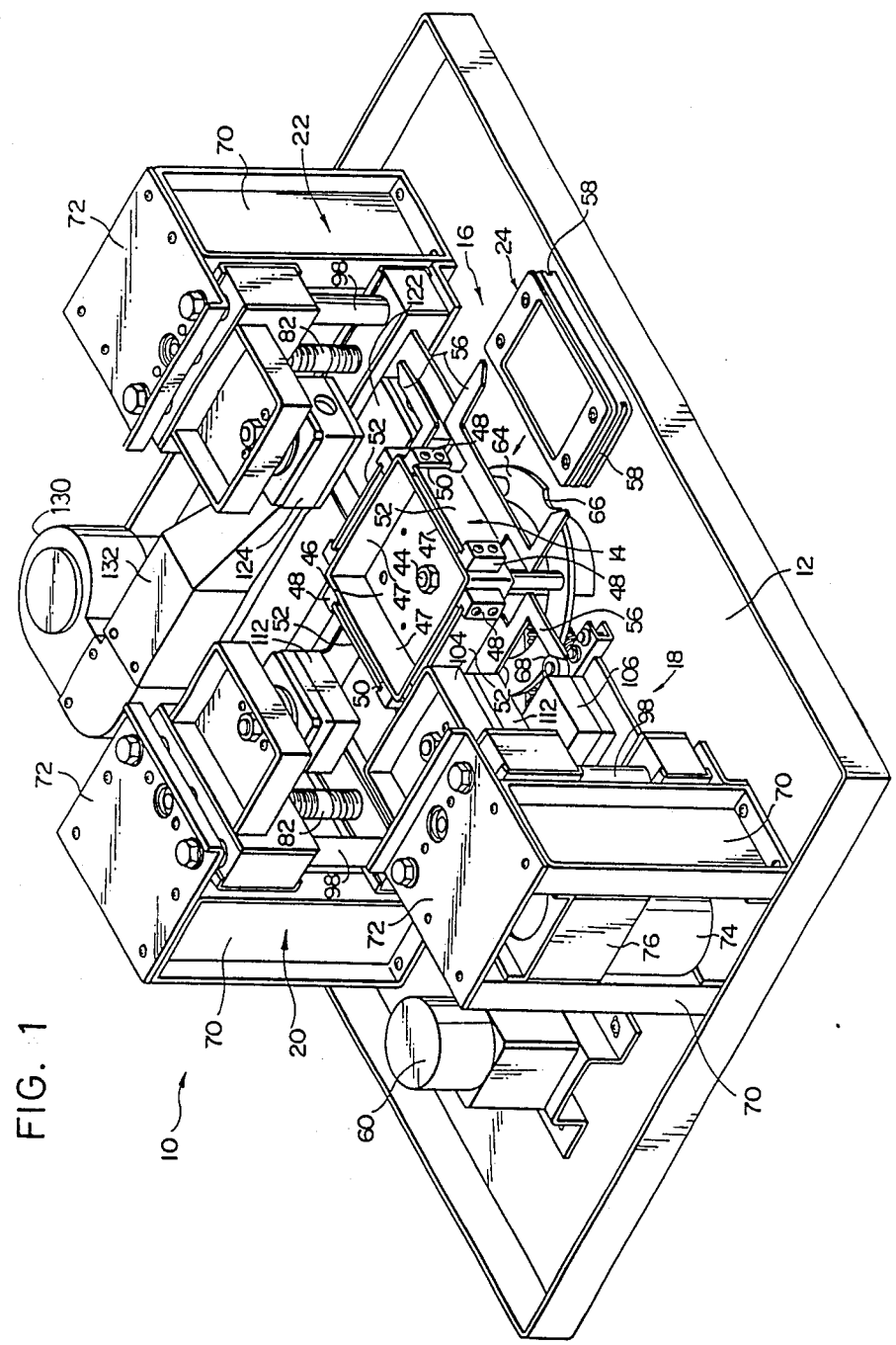
FIG. 1 is a perspective view of one embodiment of the resin laminated card producing apparatus according to the present invention.
Figure 2:
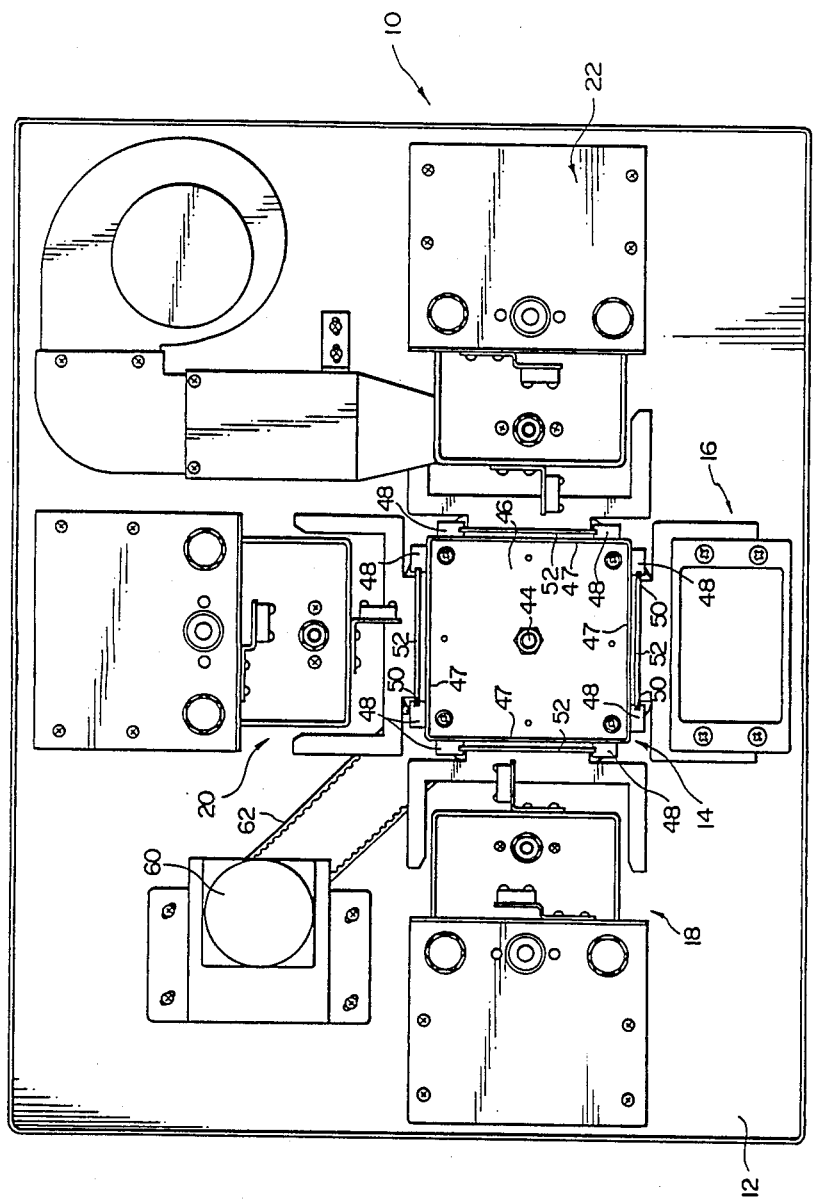
FIG. 2 is a plan view of the apparatus shown in FIG. 1.

FIGS. 1 and 2 show in combination a resin laminated card producing apparatus 10. This apparatus 10 has a machine frame 12, and a driving means 14 is disposed on the substantially central portion of the frame 12. A cassette loading and unloading section 16, a first press-heating station 18, a second press-heating station 20 and a cooling station 22 are disposed around the driving means 14 at equal spacings.

A cassette 24 is loaded on the driving means 14 at the cassette loading and unloading section 16. The cassette 24 is heated under pressure in the first and second press-heating stations 18, 20, cooled in the cooling station 22, and then unloaded from the driving means 14 at the cassette loading and unloading section 16.

Figure 3:
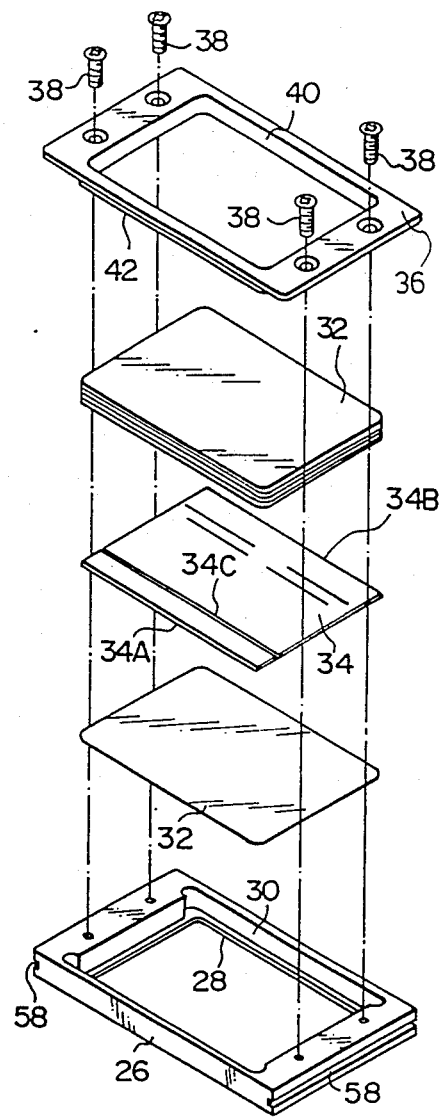
FIG.3 is an exploded perspective view of a cassette employed in the embodiment.
Figure 4:
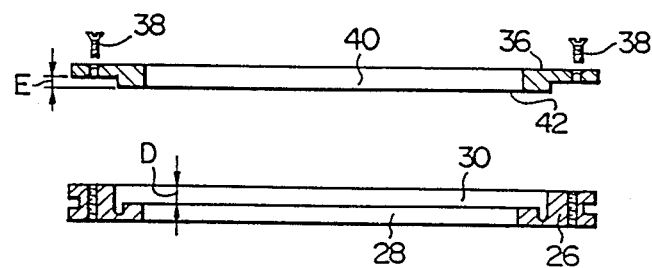
FIG. 4 is a sectional view of the cassette shown in FIG. 3.

Referring next to FIGS. 3 and 4, the cassette 24 has a cassette body 26 which is formed from a thick-walled metal material, preferably aluminum. An opening 28 having a rectangular cross-section extends through the central portion of the body 26, and an accommodating hole 30 having a larger area than that of the opening 28 is formed in the body 26 such as to extend from the surface thereof, the hole 30 having a depth D from the surface.

A plurality of metal sheets 32 are accommodated in the accommodating hole 30. A resin sheet 34 is clamped between each pair of adjacent metal sheets 32. Each resin sheet 34 is folded as at 34A and 34B, and two ends of the folded sheet 34 are brought into contact with each other to define practically two resin sheets, between which printed matter which carries a photograph, characters, etc. is inserted in advance. In consequence, when this resin sheet 34 is heated under pressure in the first and second press-heating stations 18 and 20, the obverse and reverse layers of the resin sheet 34 are thermowelded together to seal the printed matter therein.

Although in this embodiment the resin sheet 34 is folded along the portions 34A and 34B to define practically two resin sheets, two separate resin sheets may also be employed in such a manner that they are laid one upon the other and disposed between a pair of adjacent metal sheets 32.

A pressing plate 36 is laid on the cassette body 26 and rigidly secured to the latter by means of screws 38. The plate 36 has a rectangular opening 40 in opposing relation to the rectangular opening 28 provided in the body 26. A rib 42 projects from the peripheral edge of the opening 40 in such a manner that the rib 42 is fitted into the accommodating hole 30.

The distance by which the rib 42 projects from the pressing plate 36 is set such as to be E. Accordingly, when the pressing plate 36 is tightly fastened to the cassette body 26 by means of the screws 38, the clearance defined by the accommodating hole 30 and the rectangular opening 40 is (D-E). It is therefore preferable to determine the dimension (D-E) so that it equals the sum of the total thickness of a plurality of metal sheets 32 and the total thickness of finished products defined by a plurality of resin sheets 34 after they have been press-heated and the thickness thereof has consequently been reduced.

However, before being press-heated, each resin sheet 34 has a larger thickness than that of the sheet 34 when finished as a product. For this reason, even when the pressing plate 36 is tightly fastened to the cassette body 26 by means of the screws 38 before the press-heating process, a slight gap is undesirably produced between the pressing plate 36 and the cassette body 26 after the pressheating process.

In view of these circumstances, the screws 38 are adapted to continuously press a plurality of resin sheets 34 with a predetermined pressure through the pressing plate 36 even while the cassette 24 is being moved from the first press-heating station 18 to the second press-heating station 20.

The driving means 14 has a rotating shaft 44 which extends vertically and which is rotatably supported by the machine frame 12, and a frame member 46 is rigidly secured to the shaft 44. As shown in FIG. 2, the frame member 46 has a rectangular planar shape, and vertical walls 47 extend vertically from the four sides, respectively, of the frame member 46 in such a manner that the walls 47 can face the above-described stations.

Figure 5:
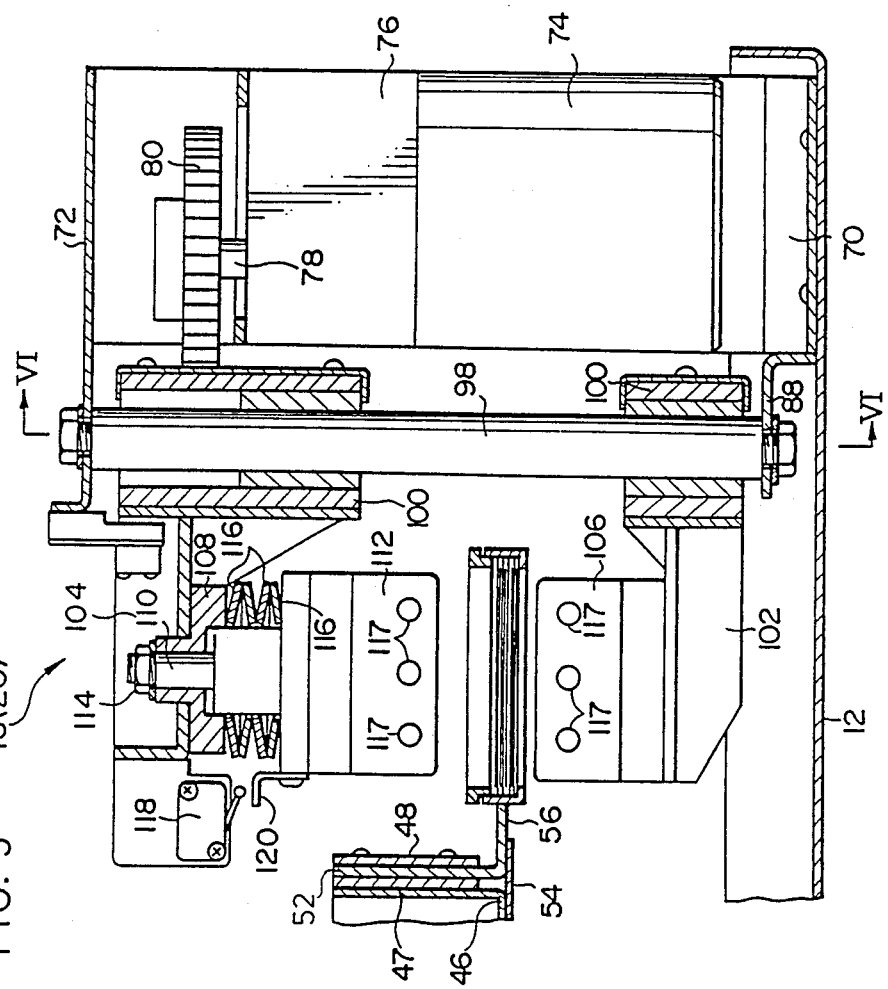
FIG. 5 is a sectional view of the first press-heating station, which corresponds to a sectional view taken along the line V—V line in FIG. 6.

A pair of guide blocks 48 are rigidly secured to the outer periphery of each of the vertical walls 47 of the frame member 46, the guide blocks 48 being spaced apart from each other at a predetermined distance. These guide blocks 48 respectively have vertical grooves 50 which face each other. Two side portions of a lifting plate 52 are respectively accommodated in these grooves 50 so that the lifting plate 52 is movable vertically. As shown in FIG. 5, the downward movement of the lifting plate 52 is limited by a stopper 54 which is rigidly secured to the frame member 46 so as to abut against the lower end of the plate 52. A fork 56 projects horizontally from the lower end portion of the lifting plate 52. Two projecting pieces which define the fork 56 are respectively fitted into parallel grooves 58 which are formed in two outer side portions of the cassette body 26. Thus, in the cassette loading and unloading section 16, the cassette 24 can be loaded onto and unloaded from the fork 56 using these grooves 58 as shown in FIG. 1. In addition, the cassette 24 is vertically movably supported by the guide blocks 48 through the fork 56 and hence the lifting plate 52.

As shown in FIG. 2, the rotating shaft 44 is operatively connected to a motor 60 secured to the frame 12 through a timing chain 62 stretched therebetween, whereby the shaft 44 is rotated and then stopped when the forks 56 face predetermined stations, respectively. For this purpose, a disk 64 is, as shown in FIG. 1, secured to the frame member 46 so as to rotate together with it. The disk 64 has circular grooves 66 formed in the outer peripheral portion thereof at a predetermined regular spacing. Thus, when one of the grooves 66 receives a detecting member 68 of a limit switch, the motor 60 is suspended, and the forks 56 are thereby positioned so as to face the respective stations.

As shown in FIG. 1, the first press-heating station 18 includes a pair of side plates 70 which stand on the machine frame 12, and the respective upper ends of these side plates 70 are connected by a top plate 72. A motor 74 and a reduction gear 76 are rigidly secured to the side plates 70.

Figure 6:
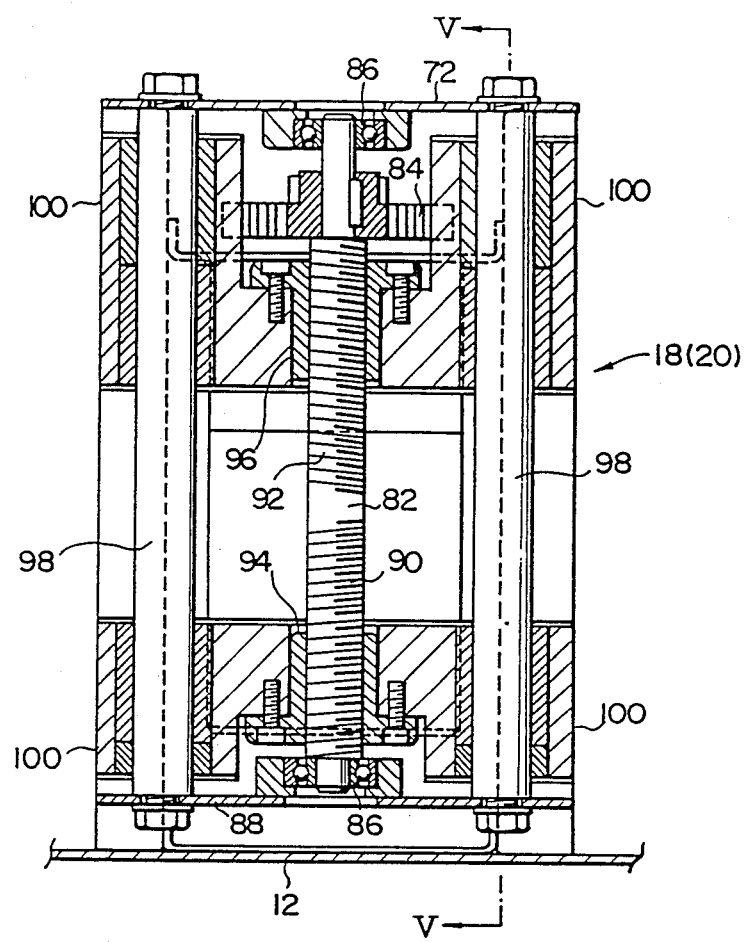
FIG. 6 is a sectional view taken along the line VI—VI in FIG. 5.

Referring to FIG. 5, a gear 80 is rigidly secured to an output shaft 78 of the reduction gear 76. This gear 80 is meshed with a gear 84 which is rigidly secured to the upper end portion of a threaded shaft 82 shown in FIG. 6.

The shaft 82 has the upper and lower end portions thereof rotatably supported through bearings 86 so that the axis of the shaft 82 extends vertically. The bearing 86 which supports the upper end portion of the shaft 82 is rigidly secured to the top plate 72, while the bearing 86 which supports the lower end portion of the shaft 82 is rigidly secured to a bracket 88 which projects from the frame 12.

A right-hand external thread 90 is cut in the lower end portion of the intermediate portion of the shaft 82, and a left-hand external thread 92 in the upper end portion thereof, these threads 90 and 92 being in thread engagement with internal threads formed in lower and upper lifting blocks 94 and 96, respectively. The blocks 94 and 96 are movably supported on a pair of guide posts 98 through bearings 100, respectively, the guide posts 98 being disposed parallel to the shaft 82. The respective upper ends of the guide posts 98 are rigidly secured to the top plate 72, and the lower ends thereof to the bracket 88.

Accordingly, the lower and upper lifting blocks 94 and 96 are moved toward and away from each other in equal amounts in response to the rotation of the motor 74.

Arms 102 and 104 respectively project from the blocks 94 and 96 toward the driving means 14. A pressing block 106 projects from the arm 102 toward the arm 104.

A spring seat 108 is rigidly secured to the arm 104, and a shaft 110 extends through the axial center of the spring seat 108. A pressing block 112 is rigidly secured to the lower end of the shaft 110 in one unit. The upper end portion of the shaft 110 projects from the upper side of the spring seat 108, and a nut 114 is screwed onto this projecting end potion, thereby preventing the shaft 110 from coming off the spring seat 108.

A combination of a plurality of coned disc springs 116 is disposed between the pressing block 112 and the spring seat 108. Accordingly, the pressing blocks 106 and 112 are movable toward and away from each other in unison with the movements of the lower and upper lifting blocks 94 and 96.

Figure 8:
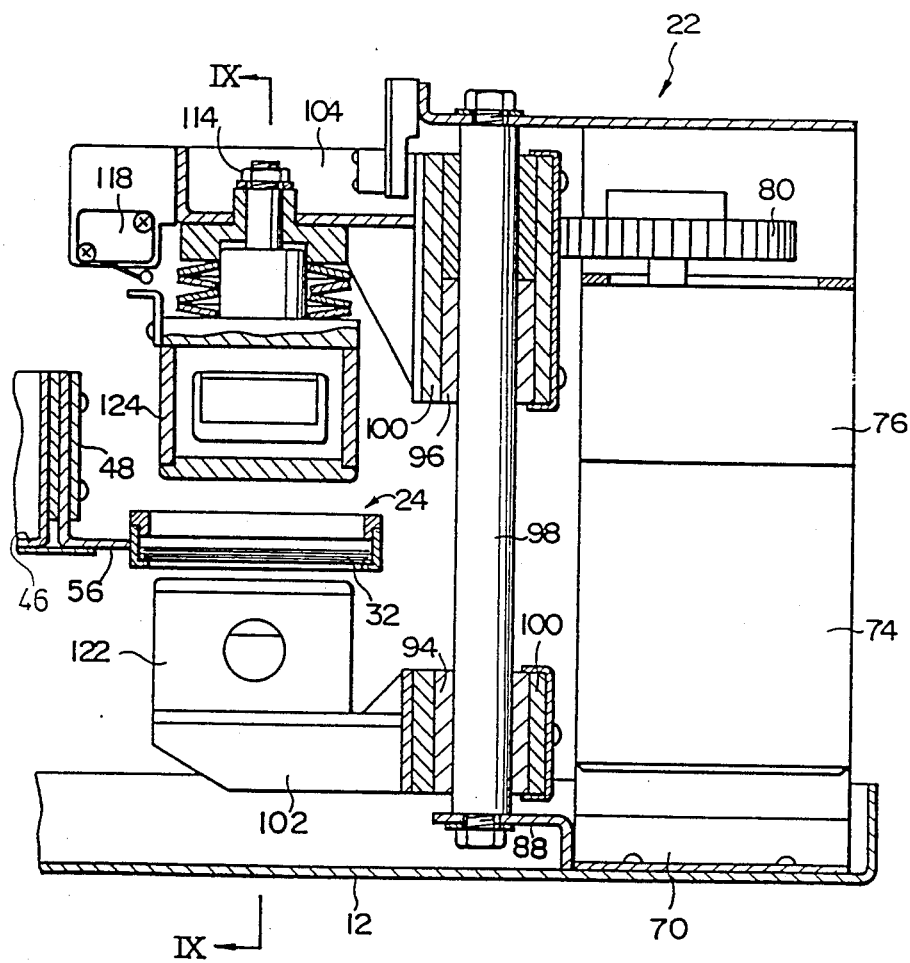
FIG. 8 is a sectional view of the cooling station.

When the pressing blocks 106 and 112 are moved toward each other, they are respectively inserted into the rectangular openings 28 and 40 in the cassette 24 which is positioned in the first press-heating station 18, thereby applying a relatively large pressing force to a plurality of metal sheets 32 as shown in FIG. 8. Heaters 117 are disposed in the pressing blocks 106 and 112 so that it is possible to heat the resin sheets 34 to a desired temperature through the metal sheets 32 while applying pressure thereto.

Although the pressing block 106 is rigidly secured to the arm 102, the pressing block 112 is supported by the arm 104 through the coned disk springs 116. Therefore, during the pressing operation the block 112 is movable relative to the arm 104 under a predetermined load. This relative movement is detected in such a manner that a striker 120 which is rigidly secured to the block 112 presses a limit switch 118 rigidly secured to the arm 104.

In this case, the amount of displacement of the coned disk springs 116 occurring when a required pressing force is generated has been obtained in advance by calibration through a load cell disposed between the pressing blocks 106 and 112. In an actual operation, when the set amount of displacement is reached, this state is detected by the limit switch 118, whereby it is possible to reliably apply a desired pressing force to the resin sheets 34.

Figure 7:
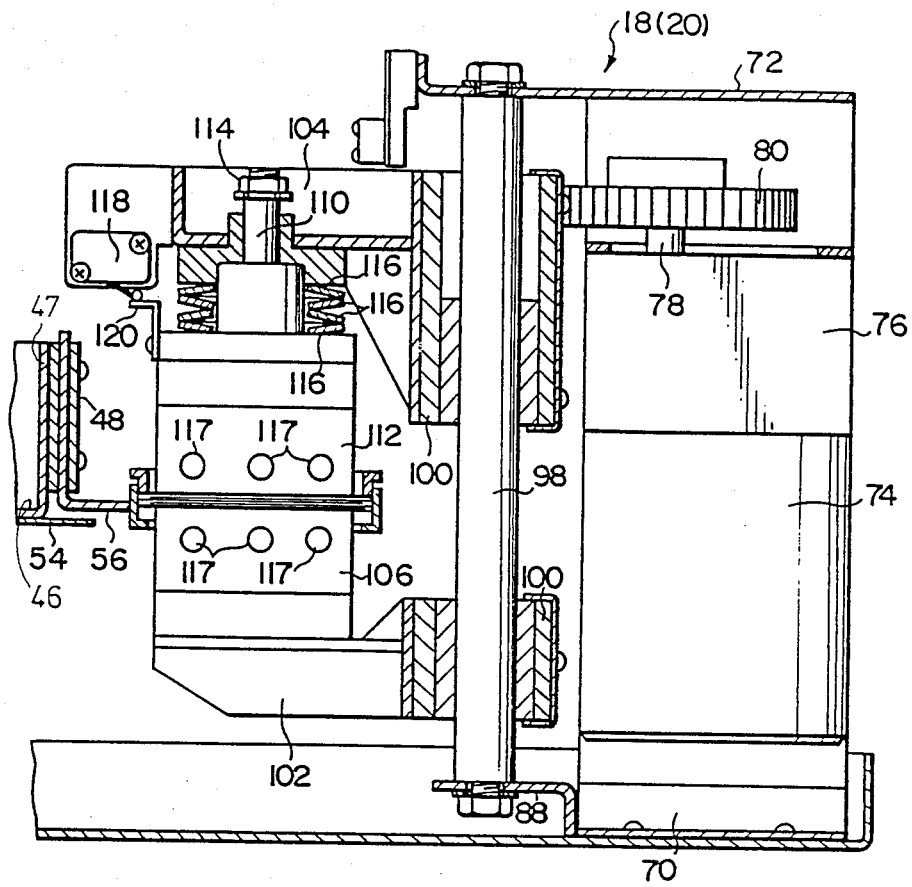
FIG. 7 shows the operation of the first press-heating station shown in FIG. 5.

When the pressing force is applied to the resin sheets 34 in the cassette 24, the driving means 14 need not maintain the cassette 24 at a retained position in the vertical direction with specially high accuracy since the cassette 24 is vertically movable relative to the fixed guide blocks 48 through the fork 56 and the lifting plate 52. More specifically, it is only necessary to arrange the mechanism such that, when the pressing blocks 106 and 112 clamp the metal sheets 32 therebetween as shown in FIG. 7, the cassette 24 is slightly moved upward together with the fork 56 with respect to the frame member 46.

Since the arrangement and operation of the second press-heating station 20 are similar to those of the first press-heating station 18, description thereof is omitted.

Figure 9:
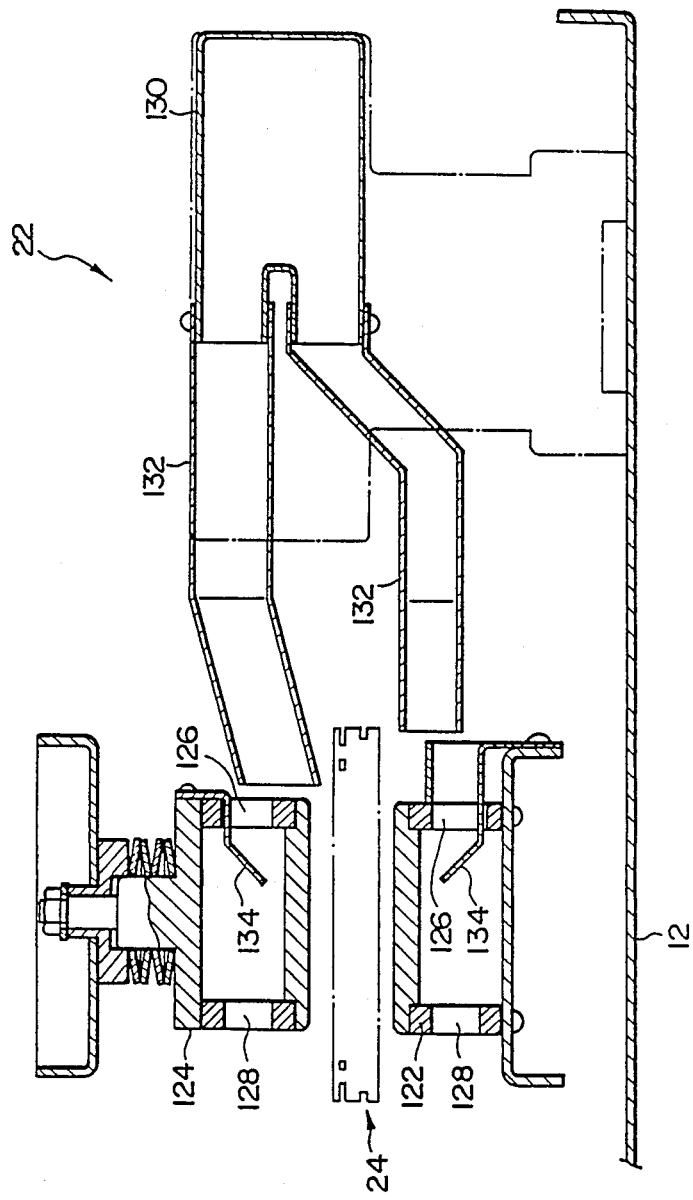
FIG. 9 is a sectional view taken along the line IX—IX in FIG. 8.
Figure 10:
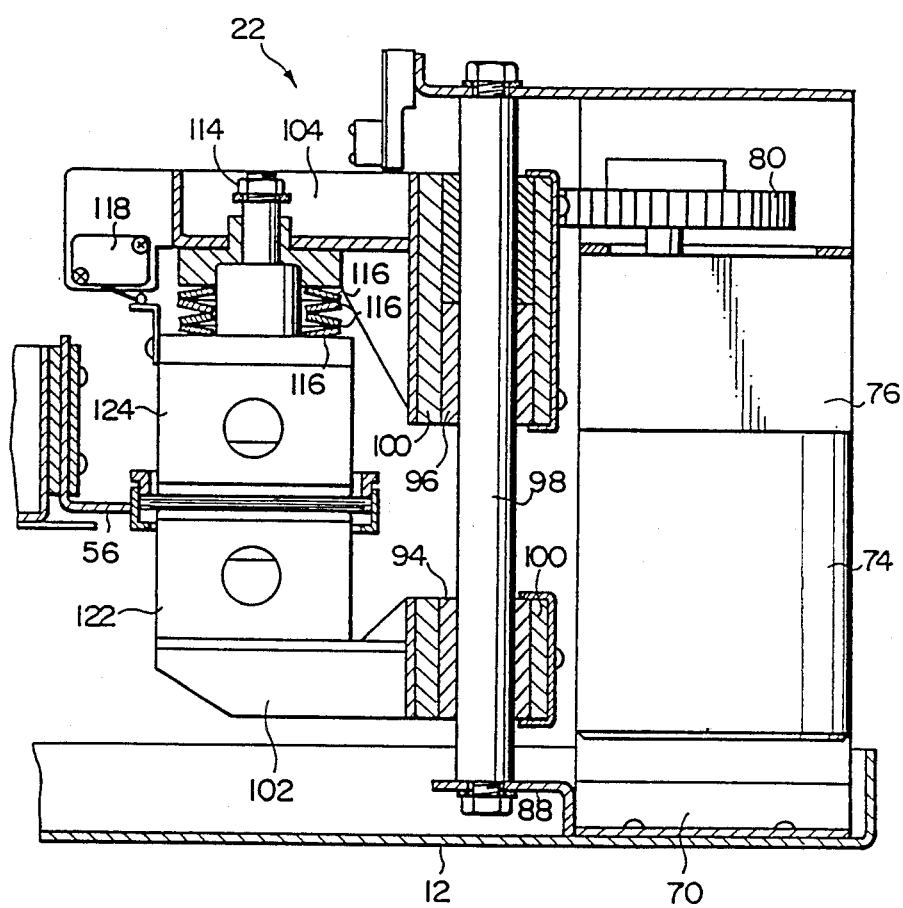
FIG. 10 shows the operation of the cooling station shown in FIG. 8.

Referring to FIGS. 1, 8 and 9, the cooling station 22 also has a vertically moving mechanism similar to that in the first press-heating station 18. More specifically, the rotation of a motor 74 is transmitted to a threaded shaft 82 through a reduction gear 76 and a pair of gears 80 and 84, thereby allowing power and upper lifting blocks 94 and 96 to move toward and away from each other while being guided by guide posts 98.

Further, pressing blocks 122 and 124 are similarly disposed on arms 102 and 104 which project from the lower and upper lifting blocks 94 and 96, respectively. Accordingly, these pressing blocks 122 and 124 produce a pressing force through coned disc springs 116 in a way similar to that in the case of the first press-heating station 18. However, the biasing force of the springs 116 is set such as to be relatively small because the pressing force required in the cooling station 22 is smaller than that in the first and second press-heating stations 18 and 20.

In addition, the pressing blocks 122 and 124 in the cooling station 22 are made hollow as shown in FIG. 9, and cooling air inlet and outlet openings 126 and 128 are provided at two ends, respectively, of each of the blocks 122 and 124. The inlet openings 126 are adapted to be able to face ducts 132, respectively, which extend from a fan 130 secured to the frame 12. Thus, when the pressing blocks 122 and 124 are pressing the cassette 24, they are cooled by the cooling air, thus cooling the resin sheets 34 through the metal sheets 32.

In order to efficiently apply this cooling air to the surfaces of the pressing blocks 122 and 124 which are in contact with the cassette 24, guide plates 134 are respectiely secured to the blocks 122 and 124 so as to direct the cooling air to portions of the blocks 122 and 124 which are in contact with the cassette 24.

The cassete 24 accommodates a plurality of metal sheets 32 and resin sheets 34, each resin sheet being disposed between each pair of adjacent metal sheets 32, in the space defined between the cassette body 26 and the pressing plate 36, and the plate 36 is rigidly secured to the body 26 by means of the screws 38. In the cassette loading and unloading section 16, this cassette 24 is loaded onto the fork 24 using the grooves 58 formed in two outer side portions of the cassette 24.

Then, the driving means 14 causes the frame member 46 to rotate a ¼ turn by means of the driving force derived from the motor 60, so that the cassette 24 mounted on the frame member 46 faces the first press-heating station 18.

In the first press-heating station 18, the lower and upper lifting blocks 94 and 96 are moved toward each other by means of the driving force from the motor 74 and inserted into the rectangular openings 28 and 40, respectively, in the cassette 24 to clamp the plurailty of metal sheets 32 with a relatively large force as shown in FIG. 7. At the same time, an electric current is supplied to the heaters 11 within the blocks 106 and 112, so that each of the resin sheets 34 clamped between the metal sheets 32 is heated under pressure and thereby thermowelded.

In this case, a desired pressing force is reliably applied through the control effected by the limit switch 118 which is actuated when the coned disk springs 116 are displaced by a preset amount. If there were no coned disk springs 116, it would be necessary to finely control the amount of rotation of the threaded shaft 82 in order to obtain a desired pressing force, which is impractical.

In the first press-heating station 18, heating under pressure is carried out only a half of the time required for the resin sheets 34 to be completely thermowelded. Thereafter, the motor 60 is rotated again so that the driving means 14 moves the cassette 24 from the first press-heating station 18 to the second press-heating station 20. During this movement also, the cassette 24 is maintained in a state wherein the cassette body 26 and the pressing plate 36 is producing a predetermined pressure, and it is therefore possible to minimize the amount by which the resin sheets 34 are pressed and heated in the second press-heating station 20.

In the second press-heating station 20, the resin sheets 34 in the cassette 24 are simultaneously pressed and heated by the pressing blocks 106 and 112 in a manner similar to that in the first press-heating station 18. The amounts by which the resin sheets 34 are pressed and heated may be equal to those in the case of the first press-heating station 18.

When the press-heating operation in the second press-heating station 20 is completed, the obverse and reverse layers of each resin sheet 34 are completely thermowelded together, and the printed matter which has been clamped therebetween is thereby reliably sealed.

The resin sheets 34 thus thermowelded need to be cooled in order to ensure the sealing structure. For this reason, the driving means 14 causes the cassette 24 to make another ¼ turn so that it is sent to the cooling station 22. In this cooling station 22, the pressing blocks 122 and 124 which are in contact with the metal sheets 32 cool the resin sheets 34 with the cooling air sent from the fan 130, thereby allowing each of the thermowelded resin sheets 34 to have the printed matter reliably sealed therein.

Then, the driving means 14 further makes a ¼ turn to return the cassette 24 retaining the thermowelded resin sheets 34 to the cassette loading and unloading section 16. In consequence, the operator can unload the cassette 24 and load a new cassette 24 which has not yet been subjected to a thermowelding operation.

Although in the above description of the operation a single cassette 24 is loaded on the driving means 14 due to the convenience of explanation, it is possible to load a new cassette 24 on each fork 56 which is newly disposed at the cassette loading and unloading section 16 every time the loaded cassette 24 rotates a ¼ turn so that each step in the thermowelding operation is constantly executed at each station. Thus, it is possible to obtain resin laminated cards at high efficiency.

Accordingly, the press-heating operation is shared between the first and second press-heating stations 18 and 20 so as to shorten the resin laminated card producing cycle of the apparatus 10.

It should be noted that each of the thermowelded resin sheets 34 is taken out of the cassette loading and unloading section 16 and then sent to another process where the resin sheet 34 has the periphery thereof trimmed to become a finished product. Although in this embodiment loading and unloading of the cassette 24 at the cassette loading and unloading section 16 are carried out by a manual operation, the cassette 24 may be automatically loaded and unloaded.

Figure 11:
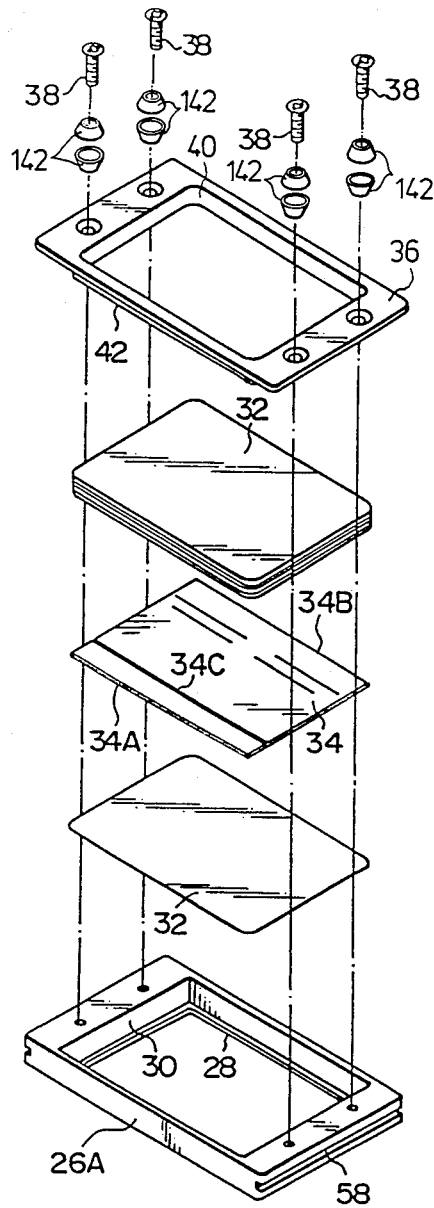
FIG. 11 is an exploded perspective view of another example of the cassette employed in the present invention.
Figure 12:
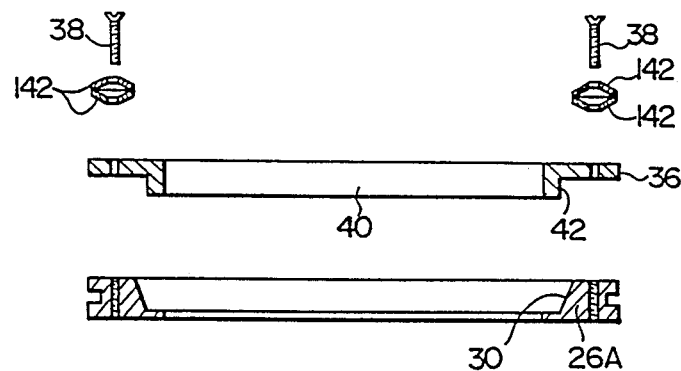
FIG. 12 is a sectional view of the cassette shown in FIG. 11.

FIGS. 11 and 12 show in combination another example of a cassette which may be employed in the present invention. In this cassette, the accommodating hole 30 in the cassette body 26A is gradually increased in the inside diameter toward the pressing plate 36. The minimum inside diameter of the hole 30 is set such as to be equal to the outside diameter of metal sheets 32 and resin sehets 34 which are to be inserted therein. In addition, the pressing plate 36, which is pressed against the cassette body 26A, is subjected to the biasing force from coned disk springs 142 which are fitted on the screws 38.

Thus, while the cassette is being moved among a plurality of press-heating stations, the clamping force produced between the pressing plate 36 and the cassette body 26A is maintained at a constant level by virtue of the coned disk springs 142. Accordingly, a clearance defined between the pressing plate 36 and the cassette body 26A when the former is completely pressed against the latter can be made equal to the sum of the total thickness of resin sheets 34 as finished products and the total thickness of a plurality of metal sheets 32.

When a resin sheet 34 is pressed, its thickness is reduced, while its area is increased, and the outside diameter thereof is consequently enlarged. Therefore, an increase in the outside diameter is accommodated by a portion of the accommodating hole 30 which has an increased inside diameter.

As has been described above, the resin laminated card producing apparatus according to the present invention comprises: a cassette retaining a plurality of resin sheets in a stacked state; a plurality of press-heating stations for thermowelding each of the resin sheets within the cassette; a cooling station for cooling the press-heated resin sheets within the cassette; and driving means for sequentially sending the cassette to each of the stations.

Accordingly, it is advantageously possible to produce a multiplicity of resin laminated cards within a short period of time.

What is claimed is:

1. An apparatus for producing resin laminated cards, comprising:
   a cassette retaining a plurality of resin sheets in a stacked state, each pair of said resin sheets having in between them a spacer sheet;
   a plurality of press-heating stations for thermowelding each of said resin sheets within said cassette;
   a cooling station for cooling said press-heated resin sheets within said cassette; and
   driving means for sequentially sending said cassette to each of said stations.

2. An apparatus according to claim 1, wherein said driving means retains said cassette in such a manner that said cassette is movable in the direction in which said resin sheets are pressed in each of said press-heating stations.

3. An apparatus according to claim 2, wherein said stations are disposed around said driving means.

4. An apparatus according to claim 1, wherein the number of said press-heating stations is larger than that of said cooling stations.

5. An apparatus according to claim 3, wherein said driving means includes a body and a retaining member which projects from said body to retain said cassette, said retaining member being adapted to intermittently pivot so as to be sequentially disposed at respective processing positions in said stations disposed around said driving means while retaining said cassette.

6. An apparatus according to claim 5, wherein said retaining member is vertically movably supported by said body.

7. An apparatus according to claim 5, wherein there are a plurality of said retaining members which are provided in such a manner as to extend radially from said body, the number of said retaining members being larger than the number of said stations by one, said cassette being loaded onto and unloaded from a retaining member which is not at any of the processing positions in said stations.

8. An apparatus according to claim 1, wherein each of said press-heating stations has: a pair of pressing blocks disposed in opposing relation to each other and in such a manner as to be reciprocatable vertically, said pressing blocks pressing said cassette from both the upper and lower sides thereof when they are moved toward each other; a heater disposed within each of said pressing blocks; and a spring resiliently supporting at least the upper pressing block in the vertical direction.

9. An apparatus according to claim 1, wherein said cooling station has a pair of hollow blocks disposed in opposing relation to each other and in such a manner as to be reciprocatable vertically, said hollow blocks clamping said cassette from both the upper and lower sides thereof when they are moved toward each other; and means for sending cooling air to the inside of each of said hollow blocks.

10. An apparatus according to claim 5, wherein said cassette has a cassette body for accommodating said plurality of resin sheets, said cassette body being able to be loaded onto and unloaded from the retaining member of said driving means; and a pressing plate secured to said cassette body to clamp said resin sheets between the same and said cassette body.

11. An apparatus according to claim 10, wherein said cassette body has retaining grooves respectively cut in two side surfaces thereof, said retaining member being a yoke engaged with said retaining grooves.

12. A cassette for retaining a plurality of resin sheets in a stacked state with spacer means arranged in between each pair of said resin sheets, said cassette being employed in a resin laminated card producing apparatus in which said cassette is moved to a press-heating station so as to thermoweld each of said resin sheet, and said cassette comprising:
a cassette body for accommodating said plurality of resin sheets; and
a pressing plate secured to said cassette body to clamp said resin sheets between the same and said cassette body.

13. A cassette according to claim 12, further comprising:
a resilient member for pressing said pressing plate against said stacked resin sheets.

14. A cassette according to claim 13, wherein said pressing plate is secured to said cassette body by means of a screw, said resilient member being interposed between said screw and said pressing plate, so that the clamping force from said screw is applied to said pressing plate through said resilient member.

15. A cassette according to claim 14, wherein said resilient member is a coned disk spring.

16. A cassette according to claim 12, wherein said resin sheets are stacked through metal sheets.

17. A cassette according to claim 16, wherein said cassette body has a hole for accommodating said stacked resin and metal sheets, said pressing plate being provided on the inner surface thereof with a pressing portion which extends into said accommodating hole when said pressing plate is secured to said cassette body.

18. A cassette according to claim 17, wherein the distance between the bottom of said accommodating hole and said pressing plate is set such as to be substantially equal to the sum of the total thickness of said metal sheets and the total thickness of said resin sheets after they have been subjected to the thermowelding process.

19. A cassette according to claim 18, wherein said accommodating hole is gradually increased in diameter from the bottom toward the mouth of said hole.

20. A cassette according to claim 19, wherein the inside diameter of said accommodating hole at the bottom thereof is set such as to be substantially the same as the diameter of said resin and metal sheets before they are subjected to the thermowelding process.

21. A cassette according to claim 17, wherein the bottom of said accommodating hole is provided with an opening through which one of the pressing members of said press-heating station is able to enter said accommodating hole, while said pressing plate is provided in the center thereof with an opening through which the other pressing member is able to enter said accommodating hole.

22. A method of producing resin laminated cards, comprising the steps of:
stacking a cassette with a plurality of resin sheets in such a manner that said sheets are retained by said cassette and in such a manner that a spacer sheet is provided between each pair of said resin sheets;
sequentially sending said cassette to a plurality of press-heating stations so as to thermoweld each of said resin sheets; and
moving said cassette from one press-heating station to another while maintaining a pressed state of said cassette.

* * * * *